United States Patent [19]

Coleman

[11] 4,204,143

[45] May 20, 1980

[54] PULSE WIDTH MODULATED POWER AMPLIFIER FOR DIRECT CURRENT MOTOR CONTROL

[75] Inventor: Randolph D. Coleman, Ridgecrest, Calif.

[73] Assignee: The United States of America as represented by the Secretary of the Navy, Washington, D.C.

[21] Appl. No.: 945,989

[22] Filed: Sep. 26, 1978

[51] Int. Cl.$^2$ .............................................. H02P 7/28
[52] U.S. Cl. .................................. 318/341; 318/563; 318/681
[58] Field of Search ............... 318/341, 681, 503, 505, 318/345 B, 345 C, 345 G

[56] References Cited

U.S. PATENT DOCUMENTS

| | | | |
|---|---|---|---|
| 3,260,912 | 7/1966 | Gregory | 318/341 |
| 3,427,520 | 2/1969 | Oppedahl | 318/18 |
| 3,428,880 | 2/1969 | Muller | 318/341 |
| 3,477,004 | 11/1969 | Westbrook | 318/217 |
| 3,480,849 | 11/1969 | Thornsen et al. | 318/257 |
| 3,496,441 | 10/1966 | Heider et al. | 318/257 |
| 3,525,029 | 8/1970 | Joslyn et al. | 318/681 |
| 3,560,829 | 2/1971 | Brennan | 318/681 |
| 3,585,406 | 6/1971 | Colter | 318/681 |
| 3,809,981 | 5/1974 | Malda | 318/294 |
| 3,883,786 | 5/1975 | McNaughton | 318/317 |
| 3,942,085 | 3/1976 | Tadakuma et al. | 318/341 |
| 4,146,827 | 3/1979 | Krohn | 318/341 |

*Primary Examiner*—David Smith, Jr.
*Attorney, Agent, or Firm*—R. S. Sciascia; W. Thom Skeer; K. G. Pritchard

[57] ABSTRACT

A solid state electronic circuit for controlling a reversible direct current motor from a voltage source such that it may be rotated in either direction. The reversible direct current motor is connected into a bridge circuit with semiconductor switching elements which provide that the full supply voltage is available for starting in either direction. A pair of comparators receives input signals from a triangular wave generator and a signal source and in conjunction with a cross-fire protection circuit generates the drive pulses which control the semiconductor switching elements.

3 Claims, 4 Drawing Figures

PULSE WIDTH MODULATED POWER AMPLIFIER FOR DIRECT CURRENT MOTOR CONTROL

BACKGROUND OF THE INVENTION

1. Field of the Invention

This invention relates generally to direct current motor control. More particularly this invention relates to a circuit for continuous control of a direct current motor capable of rotating in opposite directions and being energized from a single power source.

2. Description of the Prior Art

A variety of circuits exists wherein direct current motors are controlled in a bridge circuit arrangement by means of a single voltage source, permitting the motor to rotate in either a clockwise or counterclockwise direction. Such prior art circuits conventionally use switching type semiconductor devices, in particular switching type transistors. The switching devices of the prior art are arranged in the four bridge paths and open or close in pairs. This brings about a reversal of polarity of the applied voltage on the terminals of the motor so that the motor can be driven in either rotational direction.

In such prior art circuits, where the noise levels introduced by switching transients did not outweight the need for high efficiency in delivering power to the direct current motor, the use of conventional switching type transistors was satisfactory For certain applications however, a direct current motor control circuit is required which can be characterized by high efficiency, excellent linearity, low noise levels and small physical size.

SUMMARY OF THE INVENTION

The invention employs a bipolar triangular wave generator in conjunction with a signal source to generate clockwise and counterclockwise drive pulses. The drive pulses are gated by a cross-fire protection circuit, this circuit being necessary to prevent a short circuit condition in the silicon controlled rectifier bipolar power bridge circuit. The drive pulses then turn on their respective halves of the silicon controlled rectifier bipolar power bridge circuit allowing power supply current to flow through the direct current motor at nearly the full voltage of the power supply. The use of silicon controlled rectifiers in the lower half of the power bridge circuit provides several desirable operating characteristics including low noise level operation, high efficiency, and near zero dynamic impedance.

DETAILED DESCRIPTION OF THE PREFERRED EMBODIMENT

Figure 1:
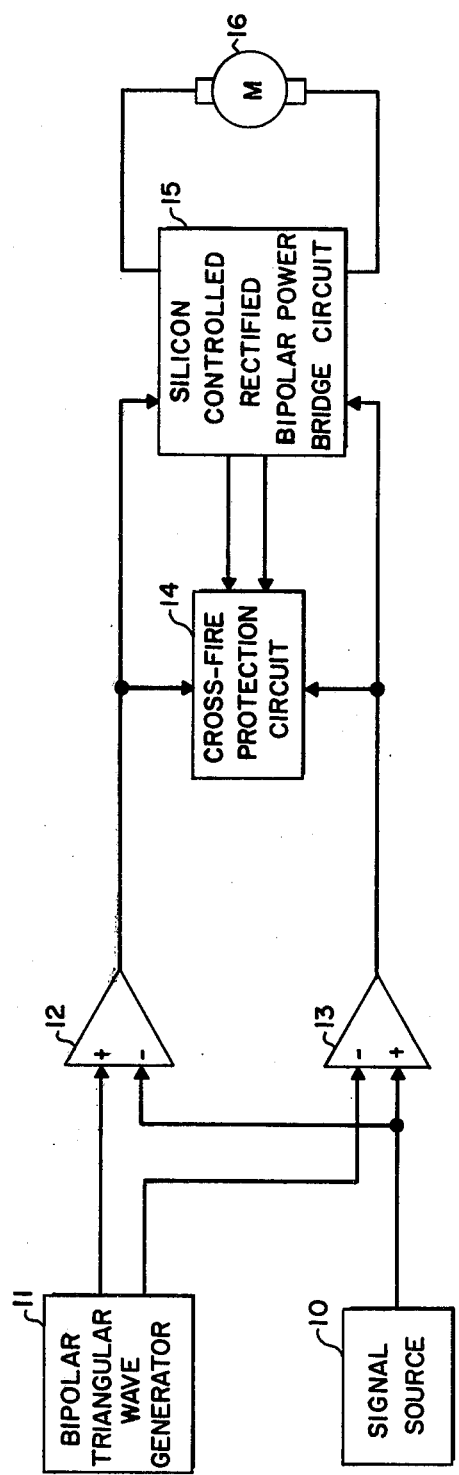
FIG. 1 is a schematic representation of the invention.

Referring to FIG. 1, the basic functional elements required to implement the pulse width modulating power amplifier for direct current motor include a signal source 10 and a bipolar triangular wave generator 11, of conventional design, both of these elements being operatively connected to a clockwise modulating means such as a comparator 12. Similarly, signal source 10 and bipolar triangular wave generator 11 are both connected to a counterclockwise modulating means such as a comparator 13. Further, comparator 12 and comparator 13 are gated by a cross fire protection circuit 14, and effectively connected to a silicon controlled rectifier bipolar power bridge circuit 15.

Figure 2:
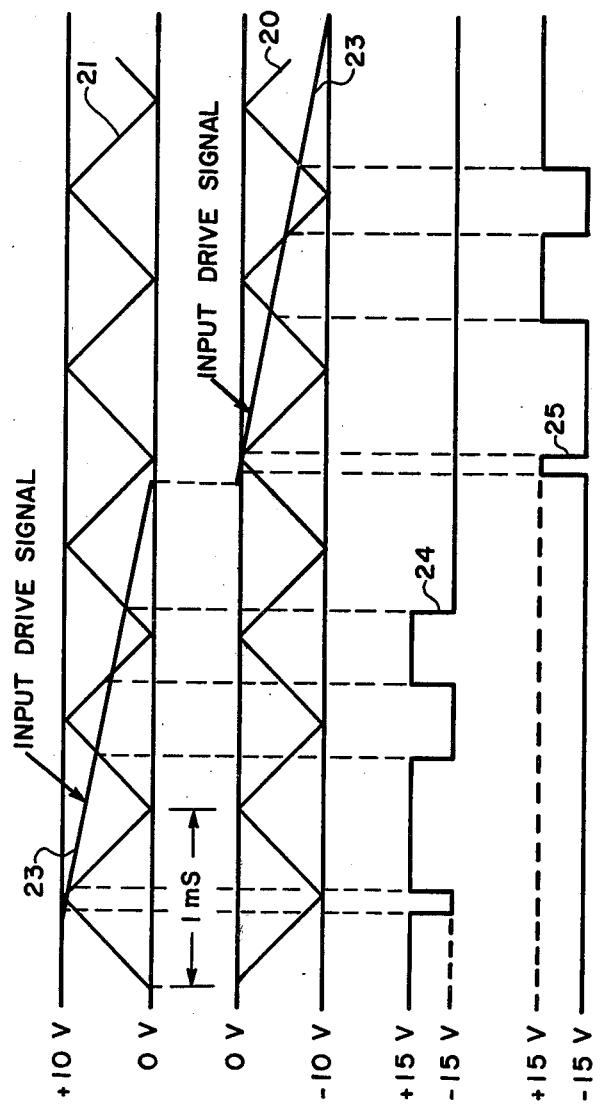
FIG. 2 is a wave form diagram of the drive pulses which turn on the silicon controlled rectifier bipolar power bridge circuit.

Referring to FIGS. 1 and 2, bipolar triangular wave generator 11 generates simultaneous positive triangle waveforms 21 and negative triangle waveforms 20, and signal source 10 generates an input drive signal 23. Input drive signal 23 and positive triangle waveforms 20 are received by comparator 13 and transformed into counterclockwise drive pulses 24. Input drive signal 23 and negative triangle waveforms 20 are received by comparator 12 and transformed into clockwise drive pulses 25. Clockwise drive pulses 25 and counterclockwise drive pulses 26 are gated by cross-fire protection circuit 14.

Assuming the conditions for a cross-fire situation do not exist, clockwise drive pulses 25 turn on silicon controlled rectifier bipolar power bridge circuit 15 allowing current to flow through reversible direct current motor 16 causing it to rotate in a clockwise direction. Similarly counter clockwise drive pulses 24 operate to turn on silicon controlled rectifier bipolar power bridge circuit 15 with the result that reversible direct current motor 16 rotates in a counterclockwise direction.

Figure 3:
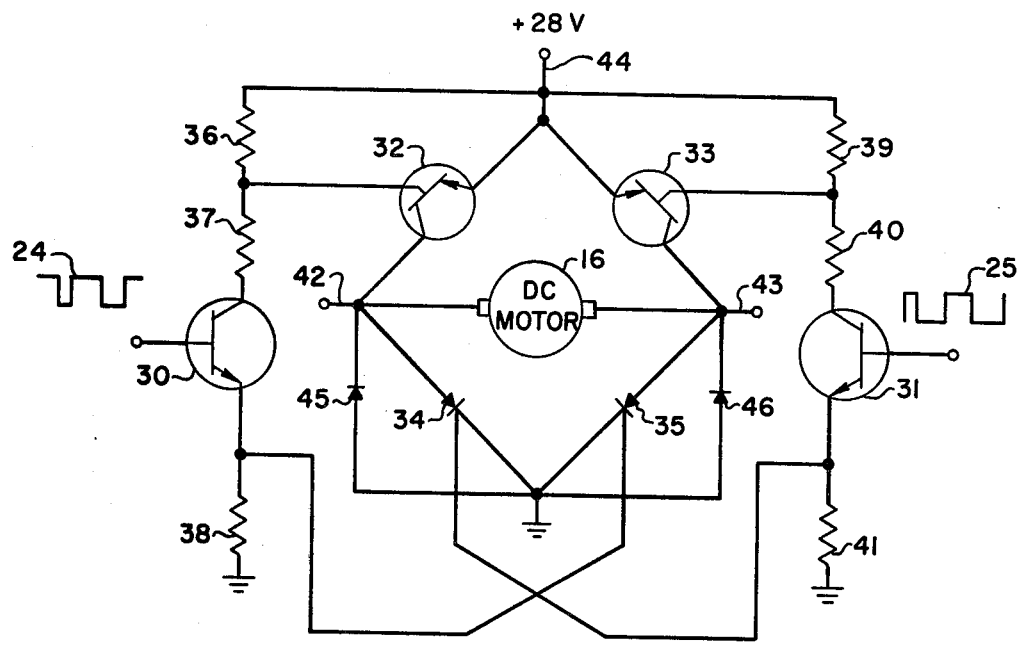
FIG. 3 is a schematic diagram of the silicon controlled rectifier bipolar power bridge circuit.

Referring to FIG. 3, the basic circuit function of silicon controlled rectifier bipolar power bridge circuit 15 will be discussed for rotation of reversible direct current motor 16 in the counterclockwise direction. The symmetry for circuit rotation of reversible direct current motor 15 in the clockwise direction is identical, and will not be discussed in detail.

Counterclockwise drive pulses 24 at the base of switching transistor 30 causes it to saturate and allows base current from switching transistor 32 to flow through resistor 37 switching transistor 30, resistor 38 and the gate of silicon controlled rectifier 35. Base current from switching transistor 32 is sufficient to cause saturation allowing point 42 to rise to nearly the voltage potential of power supply 44. Sufficient bias is provided by emitter current from switching transistor 30 across resistor 38 to fire silicon controlled rectifier 35 dropping point 43 to near ground potential. According to the electrical time constant of reversible direct current motor 16, armature current increases through the path provided by switching transistor 32 and silicon controlled rectifier 35.

Upon termination of counterclockwise drive pulse 24 switching transistor 32 is cut off but silicon controlled rectifier 35 remains latched since the collapsing magnetic field around the armature windings of reversible direct current motor 16 continues to provide armature current through the anode of silicon controlled rectifier 35. Free wheeling diode 45, which had been back biased during counterclockwise drive pulse 24, is now forward biased and conducts the decaying armature current back to reversible direct current motor 16 through point 42. If armature current does not decay below the holding current level for silicon controlled rectifier 35, when the next counterclockwise drive pulse 24 occurs, silicon controlled rectifier 35 will remain latched on and power to the motor is controlled by the switching of switching transistor 32. However, if the pulse width of counterclockwise drive pulse 24 is short with respect to the time constant of reversible direct current motor 16, the armature current will decay below the holding current for silicon controlled rectifier 35. Silicon controlled rectifier 35 will turn off and no further armature current will flow.

The use of silicon controlled rectifier 35 and silicon controlled rectifier 34 in silicon controlled rectifier bipolar power bridge circuit 15, FIG. 1, provides several desirable amplifier operating characteristics. Silicon controlled rectifier 35 and silicon controlled rectifier 34 operate at high efficiencies since they require no bias; provide low noise level operation since the armature current of reversible direct current motor 16 is shunted through silicon controlled rectifier bipolar power bridge circuit 15, FIG. 1 during the absence of drive pulses; and exhibit near zero dynamic impedance which indicates an increase in amplifier efficiency with increasing load power.

Figure 4:
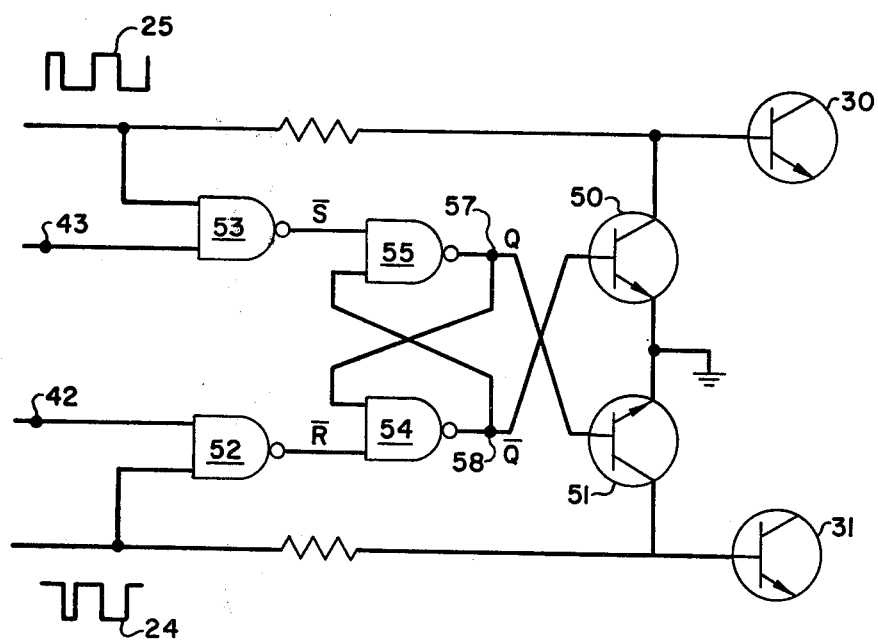
FIG. 4 is a schematic diagram of the cross-fire protection circuit.

Referring to FIGS. 1 and 4, the function of the cross fire protection circuit 14 is to detect the conduction state and prevent the driving of silicon controlled rectifier bipolar power bridge circuit 15 to a short circuit conditon. The operation of cross fire protection circuit 14 will be discussed when reversible direct current motor 116 is driven by counter-clockwise drive pulses 24. By virture of the symmetry of the circuit, analysis of the short circuit condition for reversible direct current motor 16 in the clockwise direction is identical and therefore will not be discussed in detail.

If clockwise drive pulses 25 are commanded, a potential cross fire condition exists and the state of silicon controlled rectifier 35, FIG. 3, must be monitored for a cut-off condition prior to turn-on of switching transitor 33, FIG. 3. This is accomplished by monitoring point 43 and inhibiting clockwise drive pulses 25 until it has been determined that silicon control rectifier 35, FIG. 3, has latched off.

Nand gate 54 and nand gate 55 are interconnected to form a set reset latch. Counterclockwise drive pulses 24 are gated by nand gate 52 with the anode of silicon controlled rectifier 34, FIG. 3, causing not-Q output 58 to go to a high state. It is to be noted that not-Q output 58 will only go to a high state when silicon control rectifier 34 FIG. 3, is latched off and no longer presents a potential short circuit to ground for power supply 44. When not-Q output 58 is in a high state, shunting transistor 50 will saturate and effectively shunt clockwise drive pulses 25 to ground.

The foregoing description taken together with the appended claims constitutes a disclosure sufficient to allow a person skilled in the electronics art to make and use this invention. In addition, the structure described constitutes a meritorious advance in the art and is unobvious to those artisans not having the benefit of these teachings.

Further, while the present invention has been described with reference to a specific embodiment, it will be obvious to those skilled in the art that various changes and modifications may be made without departing from the invention in its broadest aspects.

It is contemplated, therefore, in the appended claims to cover all variations and modifications of the invention which come within the true spirit and scope of the invention.

What is claimed is:

1. A pulse width modulating power amplifier for direct current motor control comprising:
   a signal source of input drive signals;
   generating means for producing simultaneous positive and negative waveforms;
   clockwise modulating means, having a first input connected to said signal source and a second input connected to said generating means, for producing clockwise drive pulses;
   counterclockwise modulating means, having a first input connected to said signal source and a second input connected to said generating means, for producing counterclockwise drive pulses;
   a silicon controlled rectifier power bridge having a first input connected to said clockwise modulating means, a second input connected to said counterclockwise means, and having first and second outputs for providing a direct current of reversible polarity and wherein said silicon conrolled rectifier power bridge comprises:
   a power supply;
   a first switching transistor connected to said power supply;
   a second switching transistor connected to said power supply;
   a first silicon controlled rectifier connected to said first switching transistor;
   a second silicon controlled rectifier connected to said second switching transistor and said first silicon controlled rectifier so as to form a bridge circuit;
   a reversible direct current motor having first and second terminals, said first terminal connected to said first switching transistor and said second terminal connected to said switching transistor;
   a first diode connected in parallel to said first silicon controlled rectifier;
   a second diode connected in parallel to said second silicon controlled rectifier;
   a third switching transistor, connected to said second silicon controlled rectifier, said first switching transistor and said counterclockwise modulating means, and
   a fourth switching transistor connected to said first silicon controlled rectifier, said second switching transistor and said clockwise modulating means; and
   a cross-fire protection means having a first input connected to said clockwise modulating means, a second input connected to said counterclockwise modulating means, a third input connected to said first output of said silicon controlled rectifier power bridge means and a fourth input connected to said second output of said silicon controlled rectifier power bridge means for preventing the driving of said silicon controlled rectifier power bridge means to a short circuit condition and wherein said cross fire protection means comprises:
   a first NAND gate having first and second inputs, said first input connected to said counterclockwise modulating means and said second input connected to said first silicon controlled rectifier;
   a second NAND gate having first and second inputs, said first input connected to said clockwise modulating means and said second input connected to said second silicon controlled rectifier;
   a set reset flip-flop having not set and not reset inputs and having Q and not-Q outputs, said not set input connected to said second NAND gate and said not reset input connected to said first NAND gate;

a first shunting transistor operatively connected to said counterclockwise modulating means, and to said Q-output of said set-reset flip-flop; and a second shunting transistor operatively connected to said first shunting transistor, said clockwise modulating means, and said not-Q output of said set reset flip-flop.

2. A pulse width modulating power amplifier for direct motor control as described in claim 1 wherein said generating means is a bipolar triangular wave generator.

3. A pulse width modulating power amplifier for direct motor control as described in either claim 1 or claim 2 wherein said clockwise and counterclockwise modulation means are comparators.

* * * * *